United States Patent

Curran et al.

[11] 3,877,663
[45] Apr. 15, 1975

[54] TRANSLATING SPLITTER VARIABLE AREA NOZZLE AND REVERSER

[75] Inventors: Robert W. Curran; William F. Dahlin, both of Seattle; Gabriel E. Stearns, Mercer Island, all of Wash.

[73] Assignee: Aeritalia S.p.A., Naples, Italy

[22] Filed: Nov. 19, 1973

[21] Appl. No.: 417,448

[52] U.S. Cl. ............ 244/110 B; 60/230; 239/265.19
[51] Int. Cl. ............................................. B64d 33/04
[58] Field of Search ............ 244/110 B, 23 D, 12 D, 244/42 CD, 52, 110 R; 239/265.19, 265.29, 265.37, 265.13; 60/229, 230, 232; 181/33 HB, 33 HC

[56] References Cited
UNITED STATES PATENTS

| 3,015,936 | 1/1962 | Brewer et al. | 244/110 B UX |
|---|---|---|---|
| 3,598,318 | 8/1971 | Schiel | 239/265.29 X |
| 3,791,586 | 2/1974 | Moorehead | 239/265.37 X |

FOREIGN PATENTS OR APPLICATIONS

| 702,290 | 3/1966 | Italy | 244/52 |
|---|---|---|---|

Primary Examiner—Trygve M. Blix
Assistant Examiner—Paul E. Sauberer
Attorney, Agent, or Firm—H. Gus Hartmann; Glenn Orlob

[57] ABSTRACT

Apparatus for varying the exhaust nozzle area, for suppressing the sound, and for reversing the thrust of a jet engine which is mounted forward and over the wing of an aircraft so as to discharge the engine thrust flow through a D-shaped exhaust nozzle exit over the upper surface of a heat shielded wing.

For varying the exhaust nozzle exit area, a splitter airfoil is located in the exhaust nozzle exit area and forms a transverse horizontal surface adjacent to the lower surface of the D-shaped exhaust duct. For increasing the exhaust exit area to provide a more quiet low speed nozzle during takeoff and landing of the aircraft, the splitter airfoil is translated longitudinally aft from within the duct to extend aft beyond the exit plane of the exhaust nozzle. For forming the required and more efficient nozzle shape at cruise flight speeds, the splitter airfoil is translated longitudinally forward, to a position within the duct, such that the cross-sectional area of the splitter airfoil decreases the total exhaust nozzle fluid flow exit area. Also, for additional thrust modulation, the splitter airfoil is rotated so as to further reduce the flow exit area.

For reversing the thrust, a clamshell panel, which forms the aft upper portion of the exhaust nozzle, is pivoted downward to cooperate with the splitter airfoil panel that is swung upward against the clamshell panel and thereby forms a clamshell blocker door arrangement to block the exhaust flow and deflect it upward and forward over the nacelle and wing.

A safety feature being in that the splitter airfoil or blocker panel when in its raised position, becomes highly loaded due to upward deflection of the rearward exhaust flow; and through its interconnecting actuating mechanism with the aft swinging clamshell panel, any actuator or linkage failure would cause the splitter airfoil to swing down from the blocked flow position thereby permitting forward thrust flow.

19 Claims, 11 Drawing Figures

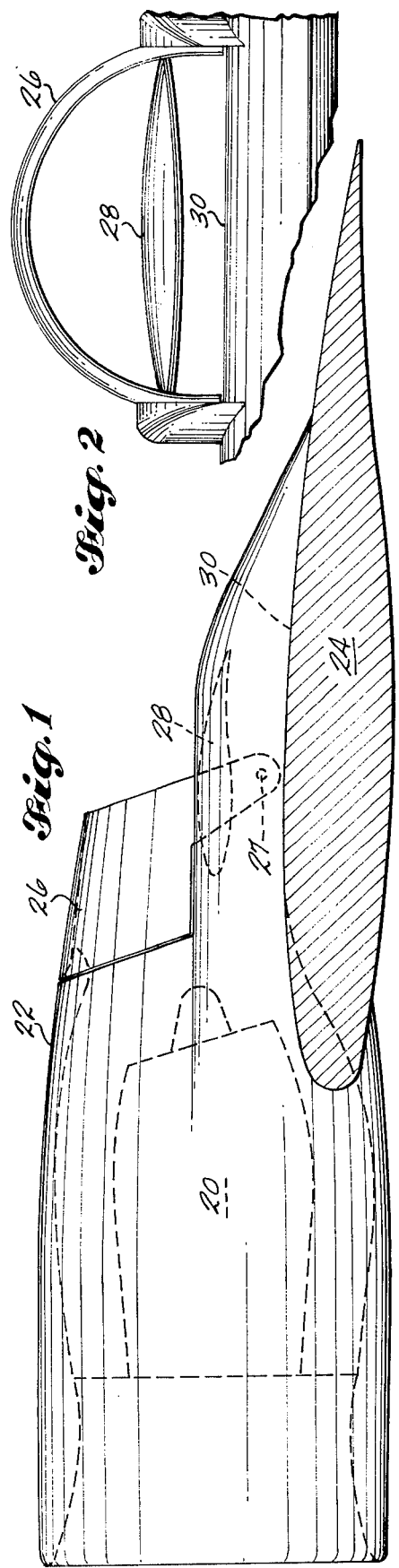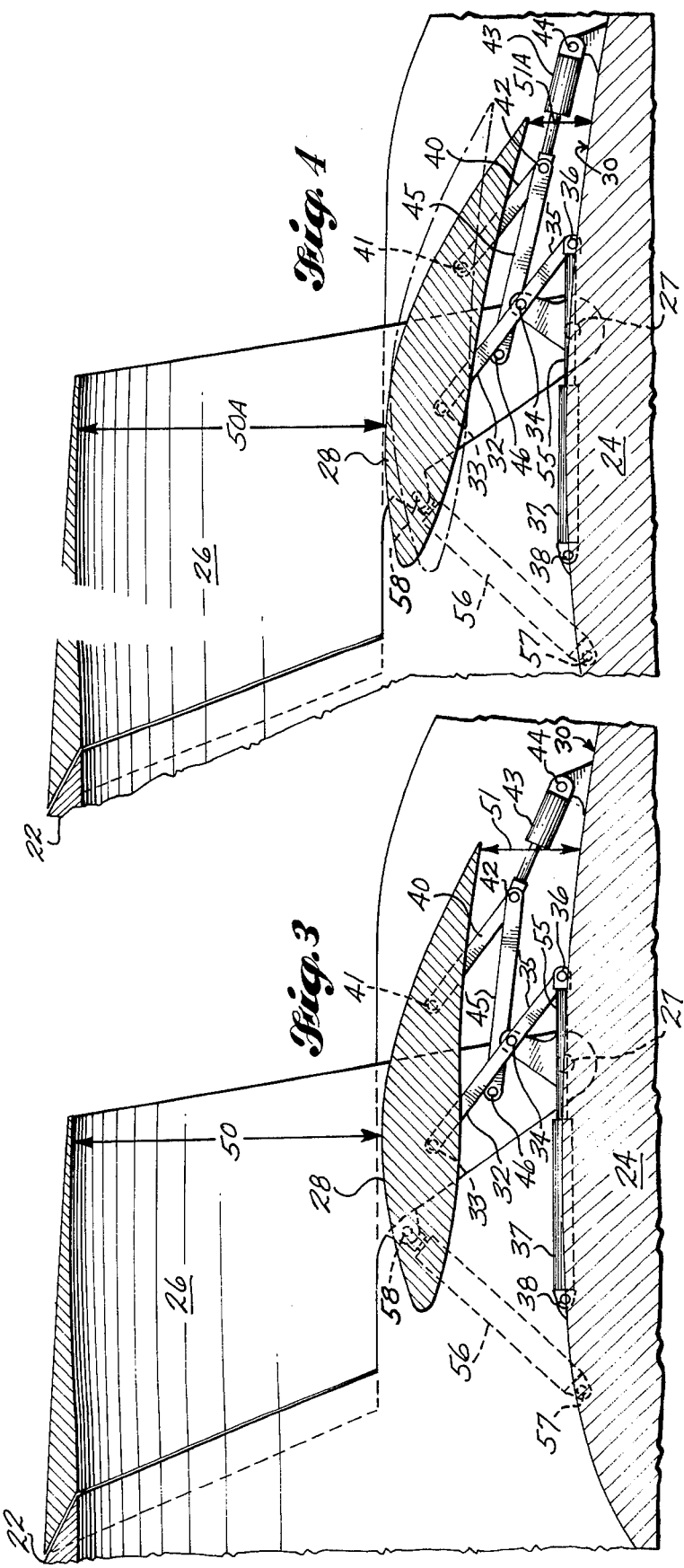

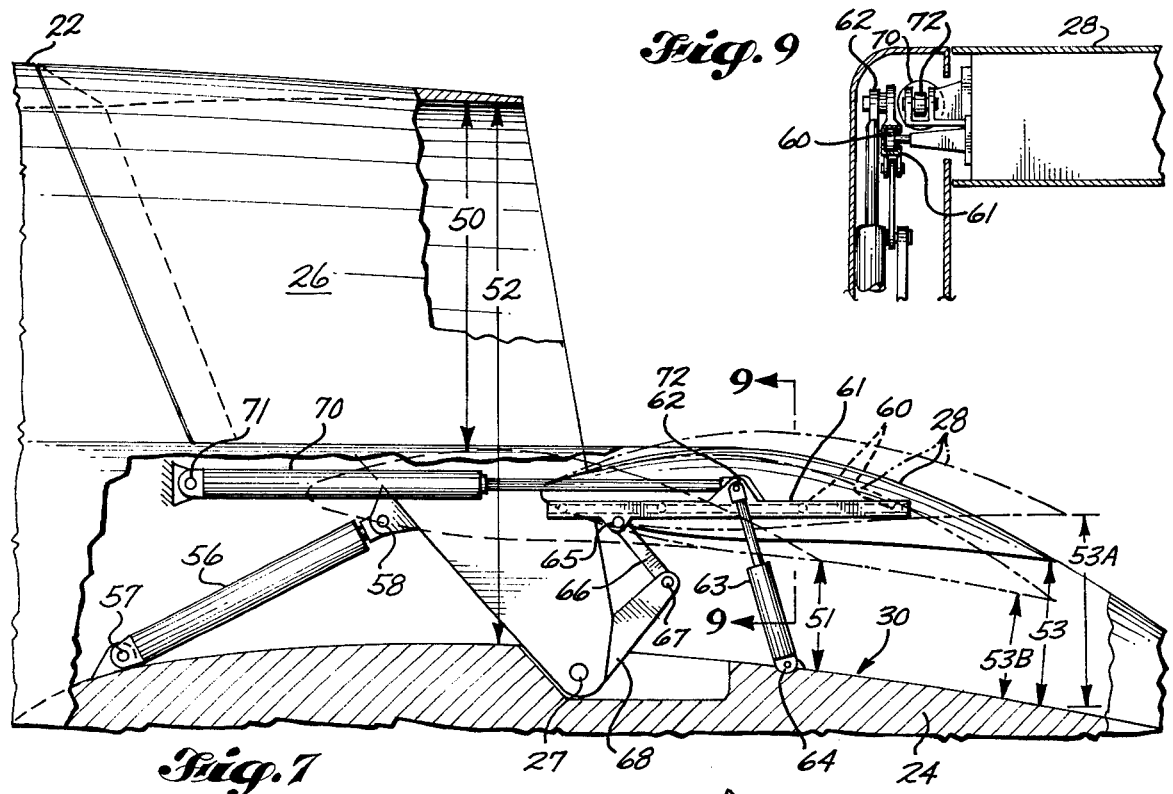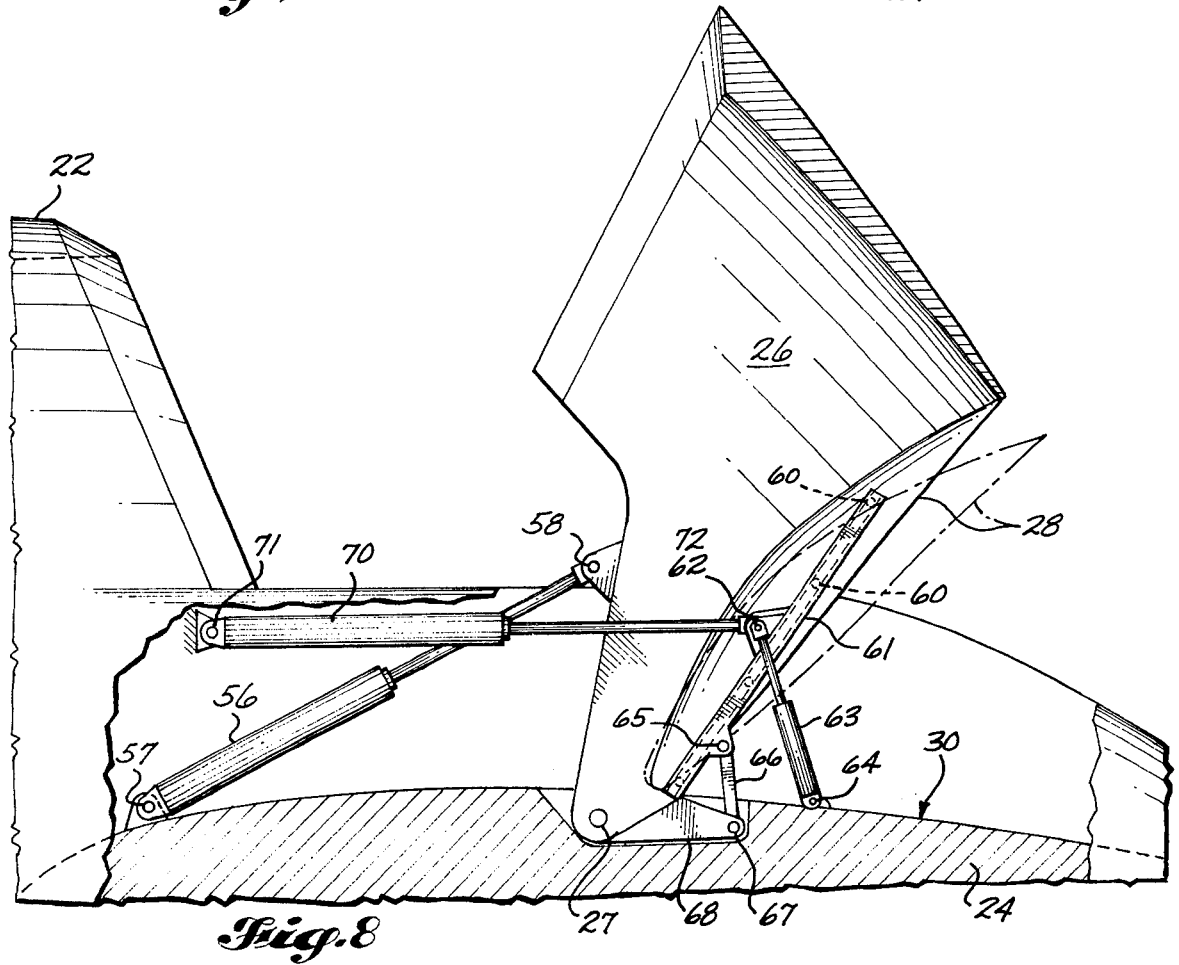

TRANSLATING SPLITTER VARIABLE AREA NOZZLE AND REVERSER

SUMMARY OF THE INVENTION

The invention relates to apparatus for varying the exhaust nozzle area, for suppressing the sound, and for reversing the thrust flow from a jet engine enclosed in a nacelle. The nacelle is mounted forward and above on the wing of an aircraft and discharges the engine exhaust flow through a D-shaped nozzle exit over the upper surface of a heat shielded wing.

For varying the exhaust nozzle area, a splitter airfoil is utilized. The splitter airfoil is translatably and pivotally adjustable and comprises an airfoil section that is horizontal and parallel to the exhaust flow when in the high speed cruise position. The splitter airfoil has its spanwise axis spaced from the heat shielded wing upper surface or a ramp which forms the lower surface of the D-shaped exhaust duct and the splitter airfoil extends from within the duct to beyond the nozzle exit and provides for a smooth transitional flow of the exhaust gases over the upper surface of the wing. The splitter airfoil transversely spans the interior of the exhaust duct to split the exhaust flow into two vertical exhaust nozzle exit areas. The exterior surface of the splitter airfoil is lined with acoustic material and in another embodiment, the splitter airfoil has one or more vertical fins for further splitting up the exhaust flow and increasing the sound attenuation characteristics. At the slower aircraft speeds, such as for takeoff and landing, the splitter airfoil is translated longitudinally aft from within the duct to extend aft beyond the exit plane of the exhaust nozzle, thereby providing the maximum exhaust nozzle area to attenuate the exhaust noise and to form the low speed exhaust nozzle. At the higher aircraft cruise speeds, the splitter airfoil is translated longitudinally forward, to a position within the duct, such that the cross-sectional area of the splitter airfoil decreases the total exhaust nozzle flow exit area and improves the thrust efficiency of the nozzle. Also, for further thrust flow modulation in the high speed cruise flight operation of the aircraft, with the splitter airfoil translated longitudinally forward, it can be rotated about a spanwise pivot from a position parallel to the streamwise exhaust flow within the duct, to a position where the trailing edge is lowered toward the wing upper surface or the ramp on the lower surface of the D-shaped shaped exhaust duct; thereby further reducing the total exhaust nozzle fluid flow exit area.

For thrust reversing, the splitter airfoil panel is rotated so as to raise its trailing edge to an upward position and deflect the exhaust flow upwardly and forwardly. Operating in combination therewith for thrust reversing, is a curved or inverted U-shaped panel which forms the aft upper section of the nacelle duct wall structure when it is in the stowed and retracted position. For the thrust reversing mode, this curved or clamshell panel is pivoted rearwardly and downwardly about a lower hinge line near the upper wing surface, thereby exposing an opening in the upper duct wall through which the exhaust flow can be directed, provided, however, that the splitter airfoil panel is also rotated upwardly in abutment relation with the clamshell panel so that the combination together forms a clamshell blocker door arrangement. This arrangement also provides a much better turning surface geometry for increasing the effectiveness of the thrust reversal.

One of the disadvantages of the conventional thrust reversing mechanisms is that if the elements of the reverser mechanism were to move due to drag forces caused by improper rigging or vibration loosening the connections, they could go into reverse thrust with high power settings in the engine and this could be disastrous. Whereas, in the present invention, the primary thrust reversing element is a splitter airfoil or blocker panel which becomes highly pressure loaded when raised to the thrust reversing positon such that the normal exhaust thrust flow will force it down to a trail or inoperative flow blockage position in the event of a malfunction.

The fail-safe mode or safety feature of the present invention is that the splitter airfoil or blocker panel, being the more highly loaded surface of the two primary parts making up the reversing means, will be forced to swing down to an inoperative trail or neutral position and through its interconnecting linkage arrangement with the clamshell panel, will force the thrust reversing apparatus to its stowed or forward thrust position in the event of an actuator failure.

BRIEF DESCRIPTION OF THE DRAWINGS

FIG. 1 is a side elevational view of a high bypass turbofan engine enclosed in a nacelle and mounted on the wing of an aircraft. The thrust reversing elements, comprising the clamshell panel at the aft portion of the nacelle and the airfoil splitter panel, are shown in their high speed cruise position;

FIG. 2 is a rear view of FIG. 1;

FIG. 3 is an enlarged detail view of the preferred embodiment shown in FIG. 1 and depicts the linkage and actuating mechanism with the splitter panel positioned within the duct of the exhaust nozzle for high speed cruise operation of the airplane;

FIG. 4 is similar to FIG. 3 and depicts the change in angle of incidence of the airfoil splitter panel for high speed cruise nozzle trim adjustment;

FIG. 7 is another embodiment of the invention wherein a slide rail or roller track and linkage mechanism is utilized for positioning the airfoil splitter panel within and outside of the exhaust nozzle exit plane for varying the exhaust area, in addition to the feature of changing the angle of incidence of the airfoil splitter panel in a manner similar to that shown in FIGS. 4 and 5;

FIG. 8 is similar to FIG. 7 and depicts the translating slide rail, linkage, and actuating mechanism for rotating the clamshell panel and airfoil splitter panel to form a clamshell blocker door thrust reversing arrangement, with the additional feature of varying the angle of the airfoil splitter panel to modulate the reversing thrust;

FIG. 9 is a rear view of a partial section taken along the line 9–9 of FIG. 7; FIGURES

DESCRIPTION OF THE PREFERRED EMBODIMENTS

Figure 5:
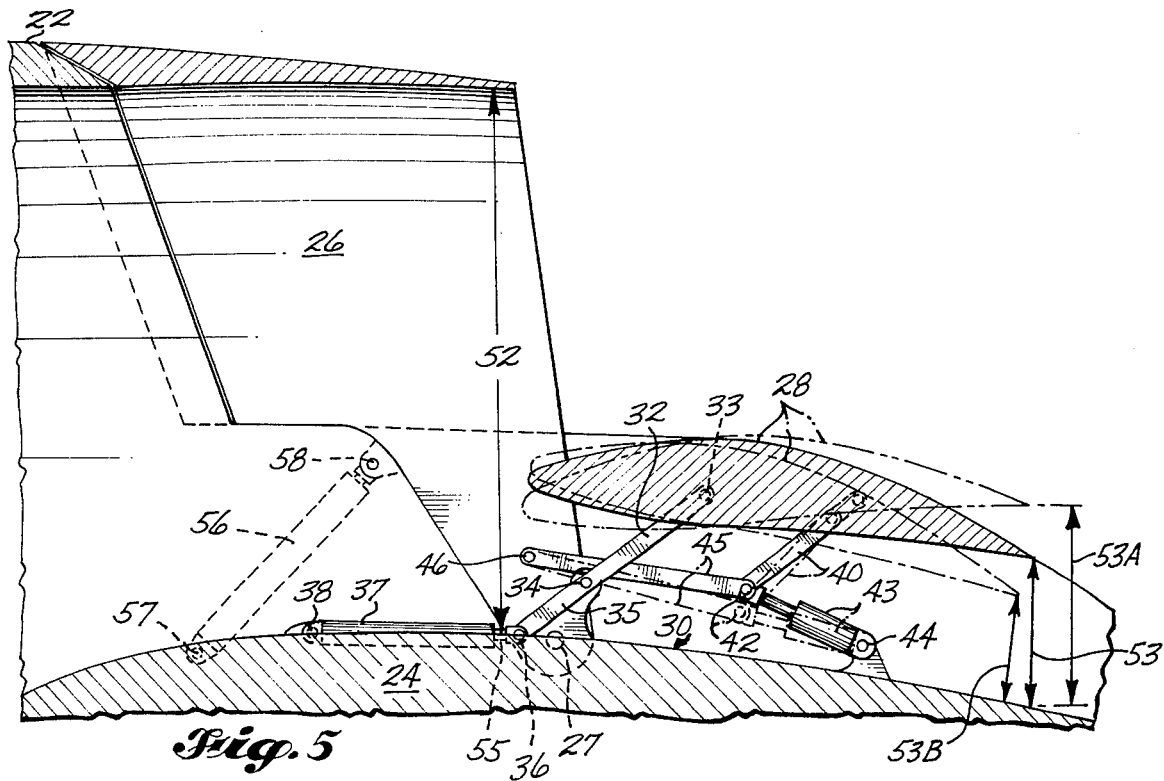
FIG. 5 is similar to FIG. 3 and depicts the airfoil splitter panel translated aft to increase the nozzle exhaust exit area for sound suppression and the low speed nozzle mode; with the additional feature of varying the angle of incidence of the airfoil splitter panel for separating or attaching the exhaust fluid flow over the upper surface of the wing.

FIG. 1 is a side view of a preferred embodiment of the present invention, showing a high bypass ratio turbofan engine 20 enclosed in a nacelle 22 which is mounted forward and above on an aircraft wing 24 so that the engine thrust flow is discharged aft over the ramp 30 or the upper surface of the heat shielded wing. The wing 24 provides a sound deflecting shield against the downward radiation of the sound waves from the engine exhaust nozzle, thereby reducing the ground noise. The nacelle 22 is mounted on the wing 24 such that its exhaust duct configuration forms a D-shaped exhaust nozzle exit with the ramp 30 or the upper surface of the heat shielded wing. The wall of the nacelle exhaust duct, at its aft end, forms an outer clamshell panel 26 of the thrust reversing apparatus. The clamshell panel 26 is mounted for pivotal rotation about an axis 27 transverse to the engine thrust line and adjacent to the upper surface of the wing 24 so that as the clamshell panel 26 pivots aft from its stowed or retracted position, it leaves an opening in the upper duct wall through which the exhaust flow can be directed; provided, however, that the airfoil splitter panel 28 is translated longitudinally downstream to its low speed position and is rotated upwardly for flow blockage in combination therewith.

FIGS. 3–6 show in enlarged detail the operating mechanism of the clamshell panel 26 and the airfoil splitter panel 28 which is spaced from the wing upper surface or a ramp 30 that forms the lower surface of the exhaust nozzle duct. The airfoil splitter panel 28 is connected to structure on the upper surface of the wing 24 through a linkage mechanism comprising: a forward drive link 32 which is connected at its upper end at 33 to a forward portion of the splitter airfoil 28, at its intermediate point 34 to fixed wing structure, and at its lower arm portion 35 to the actuator 37 at connection 36 which actuator is connected to fixed structure at 38; an aft support link 40 having its upper end pivotally connected at 41 to the aft portion of the splitter airfoil 28 and at its lower end pivotally connected at 42 to an extensible link 43 which is connected to fixed structure at 44; and an interconnecting link 45 which has its forward end pivotally connected at 46 to the clamshell panel 26 and its aft end pivotally connected at 42 to the interconnection of the aft support link 40 and the extensible link 43. The interconnecting link 45 forms part of the thrust reversing linkage mechanism that swings the airfoil splitter panel 28 up into the flow blockage position to cooperate with the clamshell panel 26, in forming the clamshell blocker door arrangement for reversing the exhaust flow; as will be more clearly described with reference to FIG. 6.

FIG. 3 shows the arrangement of the exhaust nozzle during high speed cruise operation of the airplane, wherein the continuously converging exhaust nozzle exit area is decreased for increased efficiency by positioning the airfoil splitter panel within the duct of the exhaust nozzle so that the total exhaust exit area comprises: an upper converging exhaust duct area having an exhaust exit plane 50; and a lower convergent exhaust duct area having an exhaust exit plane 51. The exhaust duct is internally contoured, including its relation to the axial or longitudinal translational movement of the splitter airfoil panel 28 for exhaust nozzle exit area variation, such that the internal exhaust duct flow area is maintained convergent toward the nozzle exit for an efficient subsonic airplane exhaust nozzle design. In order for a subsonic nozzle to be effective, the rearward flow of fluid within the duct should be consistently convergent to its nozzle exit plane and there should not be both convergency and divergency of fluid flow within the duct. Therefore: for the high speed cruise modes, FIGS. 3 and 4, with their relatively smaller total nozzle exit areas; and for the low speed takeoff and landing mode, FIG. 5, with the relatively larger total exit area 52; the area variation from the engine section to the exhaust nozzle exit or exits, should be convergent. This is achieved by careful tailoring of both the translating and pivoting airfoil splitter panel 28, and the inner surface of the exhaust duct so as to have a consistent area progression convergency whether you go to the cruise nozzle exhaust areas shown in FIGS. 3 and 4, or to the low speed mode with the relatively larger total exhaust nozzle area shown in FIG. 5.

FIG. 4 also shows the high speed cruise nozzle arrangement with the airfoil splitter panel 28 translated to its forward position, similar to FIG. 3, with the additional feature of changing the angle of incidence of the airfoil splitter panel 28 for high speed cruise nozzle trim adjustment for increased efficiency by contracting the extensible link 43. This rotates the airfoil splitter panel 28 about a spanwise axis through pivotal connection 33 to lower the trailing edge and thereby further reduces the total exhaust nozzle exit area from that shown in FIG. 3 to that of the combination of exhaust exit planes 50A upper, and 51A lower as shown in FIG. 4. It should be noted, that even though the angle of incidence of the airfoil splitter panel 28 is varied, the rearward flow of fluid to each of the exhaust exit planes 50A and 51A remains consistently convergent.

FIG. 5 shows the airfoil splitter panel 28 translated longitudinally aft from its forward position shown in FIG. 3, to a position substantially clear of the exhaust exit plane for increasing the exit area of the exhaust nozzle to the maximum indicated at 52; by retracting the linear actuator 37 and thereby rotating the drive link 32 clockwise about the fixed pivotal connection 34. The maximum exhaust area 52 is utilized during low speed flight of the airplane, such as takeoff and landing, or to increase the exhaust nozzle opening for the sound suppression mode of airplane operation. Also, if desired, by actuation of the extensible link 43 the angle of incidence of the air-foil splitter panel 28 can be varied for separating, or attaching the exhaust fluid flow over the upper surface 30 of the wing 24. When the airfoil splitter panel 28 is rotated counter-clockwise about pivotal connection 33 by extending linear actuator 43, the trailing edge of the airfoil splitter panel 28 is raised further upwardly from the upper surface 30 of the wing 24. This provides a diverging exhaust duct area, between the lower surface of the airfoil splitter panel 28 and the upper surface of the wing, which exhaust duct terminates at the indicated exit plane 53A. This divergent or expanding flow of exhaust gases, separates or causes the exhaust fluid flow to become detached from following the contour of the upper surface of the wing, thereby improving the acoustic shielding characteristics of the wing. However, if desired, the airfoil splitter panel 28 could be rotated clockwise about pivotal connection 33 by contracting the linear actuator 43 such that the trailing edge of the airfoil splitter panel 28 is lowered toward the heat shielded upper surface 30 of the wing 24 to provide a converging exhaust duct area, between the lower surface of the airfoil splitter panel 28 and the upper surface of the wing, which exhaust duct terminates at the indicated exit plane 53B. This convergent or contracted exhaust gas flow permits attached exhaust flow by increasing the boundary layer flow velocity over the upper surface of the wing and thereby provides minimum drag and increased lift.

Figure 6:
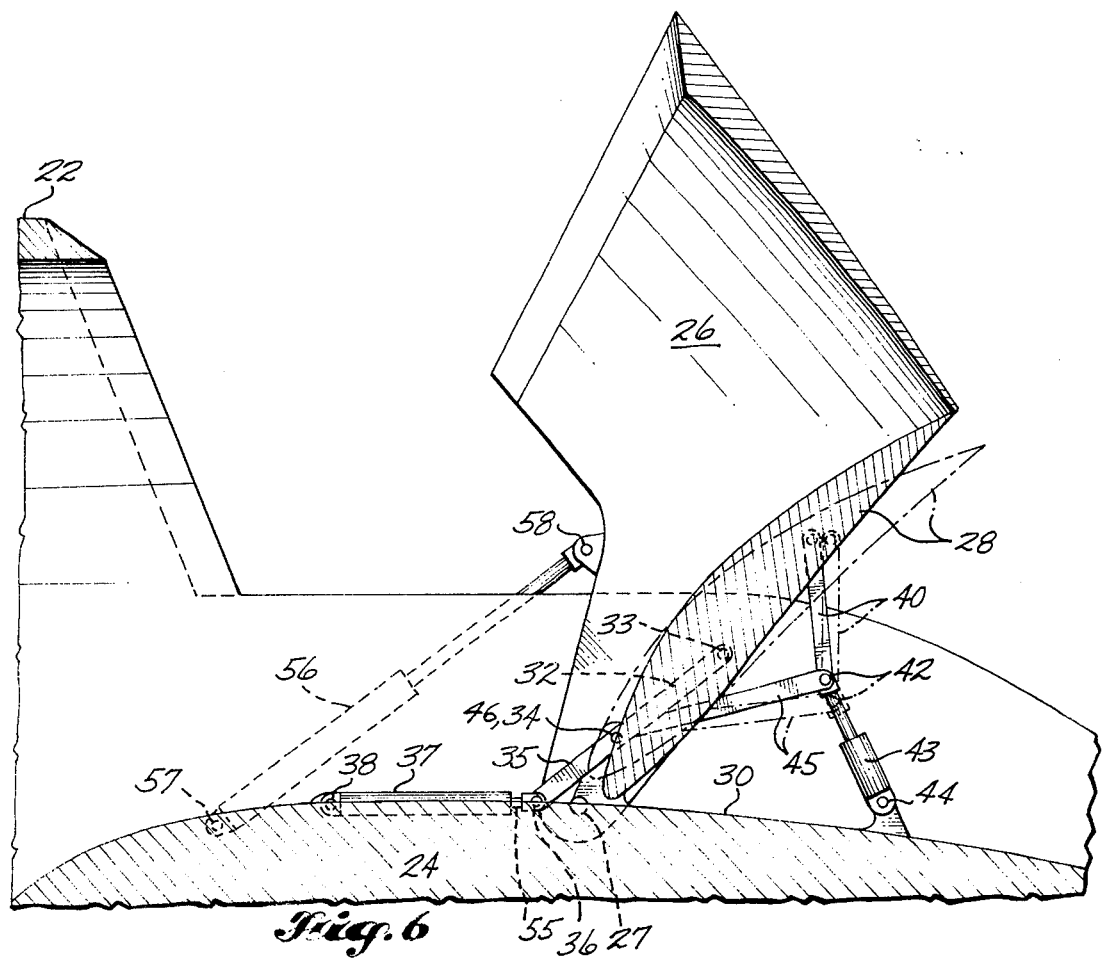
FIG. 6 is also similar to FIG. 3 and depicts the linkage and actuating mechanism with the clamshell panel and airfoil splitter panel rotated to form a clamshell blocker door thrust reversing arrangement.

FIG. 6 shows the apparatus for reversing the thrust of the engine-over-wing arrangement. The reverser is situated in the aft end of the engine-over-wing nacelle and comprises a horseshoe or clamshell shaped panel 26 which forms the wall and upper structure of the D-shaped exhaust nozzle and duct. The clamshell panel 26 is fixedly mounted for rotation about the fixed structural axis 27. The clamshell panel 26 is rotated aft to its thrust reversing position by a linear actuator 56 which is connected at 57 to fixed structure and at 58 to the clamshell panel 26. When the linear actuator 56 is extended, it swings the clamshell panel 26 aft about its axis 27 and in so doing, pushes against the interconnecting link 45, which is also connected at 46, to the clamshell panel 26. This will induce, through the interconnecting link 45 and its common connection 42 to the aft support link 40 and extensible link 43, a counterclockwise rotation of the airfoil splitter panel 28 about the pivotal connection 33, such that the airfoil splitter panel 28 will swing up into contact with the aft end of the clamshell panel 26, thereby forming a clamshell blocker door arrangement for reversing the flow. Due to the interconnecting linkage mechanism between the clamshell panel 26 and the airfoil splitter panel 28, as the two members come together to form the thrust reversal configuration, the pressure loads build up on the airfoil splitter panel 28 and thereby tend to force the reverser mechanism into the stowed or non-reversing mode. This then provides for failsafe operation so that in the event the actuation system were to lose power, the members would move back into their forward thrust positions because the airfoil splitter panel 28 becomes a highly loaded surface which will definitely over-ride any loads that are on the clamshell panel 26 and tilt it forward to return to its retracted position. Whereas, if the clamshell panel were to be tilted aft so that it rested on the upper surface of the wing, the result would be that there would not only be a less efficient flow turning geometry, but also a less safe reverse thrust condition because if actuation power were to be lost, the clamshell panel would never get back into the forward thrust mode.

FIGS. 7-9 show another embodiment of the invention wherein a slide rail or roller track and linkage mechanism is utilized for nozzle area variation, sound suppression, and thrust reversal. The airfoil splitter panel 28 is spaced from the heat shielded wing upper surface or the ramp 30 and is supported on the upper portion of the wing 24 through the following mechanism: A chordwise series of slides or rollers 60 are connected to the airfoil splitter panel 28 and engage the track 61; the track 61 is pivotally connected at its midsection 62 to the upper end of an extensible link 63, which link is connected at its lower end 64 to fixed wing structure; the forward portion of the track 61 is pivotally connected at 65 to the upper end of an interconnecting link 66, which link has its lower end pivotally connected at 67 to an arm 68 that is fixedly connected for rotation with the clamshell panel 26 about pivotal axis 27; and the airfoil splitter panel 28 is translated forward or rearward on the roller track mechanism by an actuator 70 which has its forward end connected at 71 to fixed structure and its aft end at 72 pivotally connected to the airfoil splitter panel 28. The axis of pivotal connection 72 is transversely coincident with the axis of pivotal connection 62 when the airfoil splitter panel is at its rearward position as shown in solid outline in FIG. 7.

FIG. 7 also shows the arrangement of the exhaust nozzle for both: the high speed cruise operation of the airplane wherein the airfoil splitter panel 28 is positioned forward within the duct of the exhaust nozzle as shown in dashed outline so that the total exhaust exit area comprises the upper and lower exhaust exit planes 50 and 51 respectively; and the low speed takeoff and landing mode wherein the airfoil splitter panel 28 has been translated longitudinally aft by actuator 70 to a position substantially clear of the exhaust nozzle as shown in the solid outline so as to increase the exit area of the exhaust nozzle to the maximum indicated at 52. Further, by actuation of the extensible link 63, the angle of incidence of the airfoil splitter panel 28 can be varied in both the fore and aft positions in a manner similar to that previously described with respect to the preferred embodiment shown in FIGS. 3-5.

FIG. 8 shows the arrangement of the roller track and linkage mechanism for reversing the thrust in a manner similar to that previously described with reference to FIG. 6. Extension of linear actuator 56 rotates the clamshell panel 26 clockwise about its pivotal axis 27 and in so doing, pulls down, through clamshell arm 68, on the interconnecting link 66. With the airfoil splitter panel 28 in the aft position, the axis of pivotal connection 62 is transversely coincident with the axis of pivotal connection 72, so that a downward pull on interconnecting link 66 causes the airfoil splitter panel 28 to rotate counterclockwise about the common axis of pivotal connections 62 and 72, and swing up into an enclosure contact with the aft end of the clamshell panel 26, thereby forming a clamshell blocker door arrangement for reversing the flow. Also, for reverse thrust flow modulation, the extensible link 63 can be actuated to vary the closure contact of the airfoil splitter panel 28 with the aft end of the clamshell panel 26.

Figure 10:
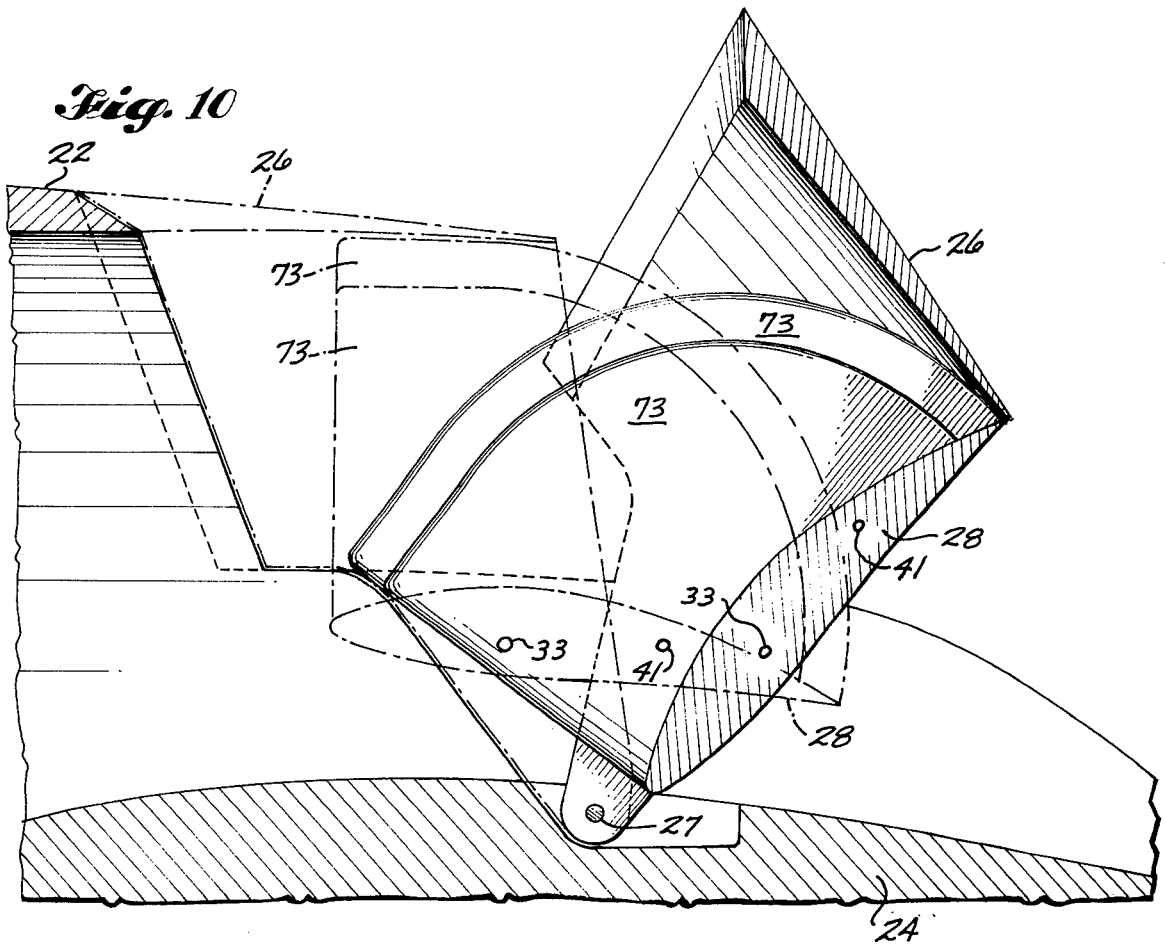
FIG. 10 is another embodiment of the invention depicting in a side elevational view an airfoil splitter panel having both horizontal and vertical panel members which can be operated by either of the mechanisms shown in the previous figures for varying the exhaust area and reversing the thrust.
Figure 11:
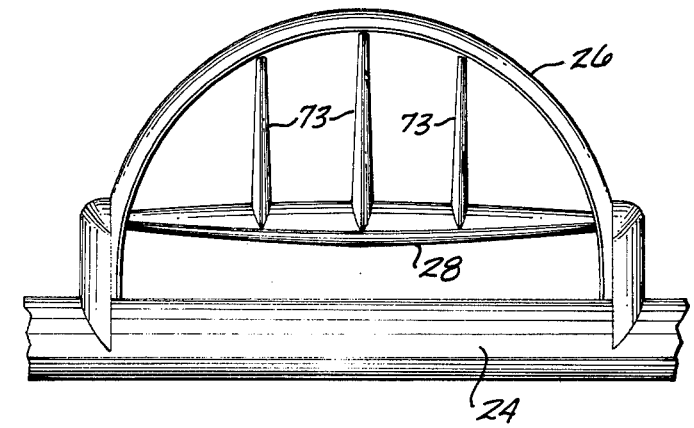
FIG. 11 is a rear view of the airfoil splitter panel shown in FIG. 10 when in its high speed cruise position depicted in dot-dash outline.

FIGS. 9 and 10 depict another embodiment of an airfoil splitter panel 28 further comprising vertical airfoil splitter panels 73. Although the actuating mechanism for this embodiment is not shown, it will be understood from the linkage mechanism shown in FIGS. 3-6, how this splitter panel could be operated.

While the invention has been described in relation to certain embodiments, it is to be understood that those modifications and changes which become obvious to a person of ordinary skill in the art, after reading the foregoing specification and its teachings, are intended to be encompassed in the invention disclosed above and limited only by the definition of the appended claims.

What is claimed is:

1. Apparatus for varying the exhaust nozzle area of a jet engine fluid flow duct, comprising: an airfoil panel positioned in the engine thrust flow and having its spanwise axis transverse to the fluid flow duct; means for longitudinally positioning the airfoil panel relative to the exhaust exit plane of the duct so as to split the fluid flow duct into two exhaust nozzles and exit flow areas; and means for changing the angle of incidence of the airfoil panel to vary the exit flow area of each of the exhaust nozzles.

2. The apparatus as set forth in claim 1, wherein: said longitudinal positioning means translates the airfoil panel longitudinally rearward to a position clear of the exhaust exit plane of the fluid flow duct to provide for the maximum exhaust nozzle area for attenuating the exhaust noise.

3. Apparatus for varying the exhaust nozzle area of a jet engine mounted in an aircraft overwing nacelle installation so as to form a D-shaped exhaust nozzle exit for flow discharge over the upper surface of the wing, comprising: an airfoil panel spaced from the upper surface of the wing and positioned in the engine thrust flow with its spanwise axis transverse to the exhaust nozzle exit; means for longitudinally positioning the airfoil panel relative to the D-shaped exhaust nozzle exit plane so as to split the D-shaped exhaust nozzle exit into two exhaust nozzles and exit flow areas; and means for changing the angle of incidence of the airfoil panel to vary the exit flow area of each of the exhaust nozzles.

4. The apparatus as set forth in claim 3, wherein: said longitudinal positioning means translates the airfoil panel longitudinally rearward to a position clear of the D-shaped exhaust nozzle exit plane to provide for the maximum exhaust nozzle area for attenuating the exhaust noise.

5. The apparatus as set forth in claim 4, comprising: means for positioning the trailing edge of the airfoil panel toward the upper surface of the wing to produce a fluid flow convergency exhaust nozzle in the space between the upper surface of the wing and the undersurface of the airfoil panel so as to provide an increased boundary layer flow velocity over the upper surface of the wing for attaching the airflow to the upper surface of the wing to increase the wing lift characteristics.

6. The apparatus as set forth in claim 4, comprising: means for raising the trailing edge of the airfoil panel away from the upper surface of the wing to produce a fluid flow divergency exhaust nozzle between the lower surface of the airfoil panel and the upper surface of the wing so as to provide a divergent or expanding flow of exhaust gases to cause the airflow to become detached from following the contour of the upper surface of the wing and thereby improving the acoustic shielding characteristics of the wing for noise suppression.

7. Apparatus for varying the exhaust nozzle area and reversing the forward thrust flow of a jet engine fluid flow duct, comprising: a first panel positioned in the engine thrust flow and having its spanwise axis transverse to the fluid flow duct; means for longitudinally positioning the first panel into and out of the exhaust exit plane of the duct for varying the exhaust exit flow area; a second panel forming an aft section of the duct wall; means for rotatably deploying the second panel aft and inwardly from the wall of the duct so as to position the second panel into the engine thrust flow in combination with rotating the first panel about a spanwise axis to cooperate in an abutment relation with the second panel in forming a blocker door arrangement for reversing the forward thrust flow.

8. The apparatus as set forth in claim 7, wherein: said longitudinal positioning means translates the airfoil panel longitudinally rearward to a position clear of the exhaust exit plane of the fluid flow duct to provide for the maximum exhaust nozzle area for attenuating the exhaust noise.

9. The apparatus as set forth in claim 7, wherein: said longitudinal positioning means translates the airfoil panel longitudinally forward to a position extending fore and aft of the exhaust exit plane of the fluid flow duct to provide for bifurcating the engine thrust flow into a pair of exhaust nozzles and decreases the total exhaust exit area from the maximum whereat the airfoil panel is positioned rearward, clear of the exhaust exit plane.

10. Apparatus in combination with a jet engine fluid flow duct for varying the duct exhaust exit area and for reversing the forward thrust flow, comprising: an airflow splitter panel positioned in the engine thrust flow and having a spanwise axis transverse to the fluid flow duct; means for axially translating the airflow splitter panel into and out of the exhaust exit plane of the duct for varying the exhaust exit flow area; a horseshoe panel forming the peripheral section of one side of the duct wall structure, and being mounted for rotation about an axis parallel to the airflow splitter panel spanwise axis transverse to the fluid flow duct; means for rotatably deploying the horseshoe panel aft and inwardly from the wall of the duct into the fluid thrust flow in combination with rotating the airflow splitter panel to an abutment relation with the aft peripheral edge section of the horseshoe panel so as to cooperate therewith in forming a clamshell blocker door arrangement for reversing the forward thrust flow.

11. The apparatus as set forth in claim 10, wherein said axially translating means translates the airflow splitter panel longitudinally rearward to a position clear of the exhaust exit plane of the fluid flow duct to provide for the maximum exhaust nozzle area for attenuating the exhaust noise.

12. The apparatus as set forth in claim 10, wherein: said axially translating means translates the airflow splitter panel longitudinally forward to a position extending fore and aft of the exhaust exit plane of the fluid flow duct to provide for bifurcating the engine thrust flow into a pair of exhaust nozzles and decreases the total exhaust exit area from the maximum whereat the airflow splitter panel is positioned rearward, clear of the exhaust exit plane.

13. Apparatus for varying the exhaust nozzle area and reversing the forward thrust of a jet engine mounted in an aircraft overwing nacelle installation so as to form a D-shaped exhaust nozzle exit for flow discharge over the upper surface of the wing, comprising: an airfoil panel spaced from the upper surface of the wing and positioned in the engine thrust flow with its spanwise axis transverse to the exhaust nozzle exit; means for longitudinally positioning the airfoil panel into and out of the D-shaped exhaust nozzle exit plane for varying the exhaust exit flow area; a clamshell panel forming the aft semi-circular portion of the D-shaped exhaust nozzle; means for rotating the clamshell panel aft and downward toward the upper surface of the wing in combination with rotating the airfoil panel about a spanwise axis raising its trailing edge from the upper surface of the wing to an abutment relation with the clamshell panel to form a clamshell blocker door arrangement for reversing the exhaust flow.

14. The apparatus as set forth in claim 13, wherein: said longitudinal positioning means translates the airfoil panel longitudinally rearward to a position clear of the D-shaped exhaust nozzle exit plane to provide for the maximum exhaust nozzle area for attenuating the exhaust noise.

15. The apparatus as set forth in claim 14, comprising:
means for positioning the trailing edge of the airfoil panel toward the upper surface of the wing to produce a fluid flow convergency exhaust nozzle in the space between the upper surface of the wing and the undersurface of the airfoil panel so as to further decrease the total exhaust exit area for improving the thrust efficiency of the jet engine and further, to modulate the jet engine thrust flow in the high speed cruise flight operation of the aircraft.

16. The apparatus as set forth in claim 14, comprising:
means for raising the trailing edge of the airfoil panel away from the upper surface of the wing to produce a fluid flow divergency exhaust nozzle between the lower surface of the airfoil panel and the upper surface of the wing so as to provide a divergent or expanding flow of exhaust gases to cause the airflow to become detached from following the contour of the upper surface of the wing and thereby improving the acoustic shielding characteristics of the wing for noise suppression.

17. The apparatus as set forth in claim 13, wherein: said longitudinal positioning means translates the airfoil panel longitudinally forward to a position extending fore and aft of the "D" shaped exhaust nozzle exit plane to provide for bifurcating the engine thrust flow into a pair of exhaust nozzles and decreases the total exhaust exit area from the maximum whereat, the airfoil panel is positioned rearward, clear of the exhaust exit plane.

18. The apparatus as set forth in claim 17, comprising:
means for varying the angle of incidence of the airfoil panel when the airfoil panel is translated longitudinally forward to a position whereat the airfoil panel extends fore and aft of the D-shaped exhaust nozzle exit plane for providing two variable cross-sectional flow area ducts wherein each duct terminates at an exhaust nozzle exit plane.

19. The apparatus as set forth in claim 17, comprising:
means for positioning the trailing edge of the airfoil panel toward the upper surface of the wing to produce a fluid flow convergency exhaust nozzle in the space between the upper surface of the wing and the undersurface of the airfoil panel so as to provide an increased boundary layer flow velocity over the upper surface of the wing for attaching the airflow to the upper surface of the wing to increase the wing lift characteristics.

* * * * *

UNITED STATES PATENT AND TRADEMARK OFFICE
CERTIFICATE OF CORRECTION

PATENT NO. : 3,877,663
DATED : April 15, 1975
INVENTOR(S) : Robert W. Curran; William F. Dahlin; Gabriel E. Stearns It is certified that error appears in the above-identified patent and that said Letters Patent are hereby corrected as shown below:

Assignees:  The Boeing Company, Seattle, Washington;
Aeritalia S.p.A., Naples, Italy Signed and Sealed this Thirty-first Day of August 1976

[SEAL]

Attest:

RUTH C. MASON
Attesting Officer

C. MARSHALL DANN
Commissioner of Patents and Trademarks